US010872225B2

(12) United States Patent
Yu et al.

(10) Patent No.: US 10,872,225 B2
(45) Date of Patent: Dec. 22, 2020

(54) INSTANTANEOUS SEARCH AND COMPARISON METHOD FOR LARGE-SCALE DISTRIBUTED PALM VEIN MICRO-FEATURE DATA

(71) Applicant: Melux Technology Co., Ltd., Guangdong (CN)

(72) Inventors: Mengchun Yu, Guangdong (CN); Qinglu Xie, Guangdong (CN); Yongbo Xue, Guangdong (CN)

(73) Assignee: Melux Technology Co., Ltd., Guangdong (CN)

( * ) Notice: Subject to any disclaimer, the term of this patent is extended or adjusted under 35 U.S.C. 154(b) by 20 days.

(21) Appl. No.: 16/512,748

(22) Filed: Jul. 16, 2019

(65) Prior Publication Data

US 2020/0342204 A1 Oct. 29, 2020

(30) Foreign Application Priority Data

Apr. 23, 2019 (CN) .......................... 2019 1 0331143

(51) Int. Cl.
*G06K 9/00* (2006.01)
(52) U.S. Cl.
CPC ..... *G06K 9/00087* (2013.01); *G06K 9/00067* (2013.01); *G06K 9/00926* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 2012/0057763 | A1* | 3/2012 | Horng | G06K 9/00067 382/115 |
| 2015/0154474 | A1* | 6/2015 | Nada | G06F 21/32 382/115 |
| 2016/0379037 | A1* | 12/2016 | Russo | G06K 9/00114 382/125 |
| 2019/0122024 | A1* | 4/2019 | Schwartz | G06K 9/6202 |
| 2019/0392189 | A1* | 12/2019 | Kumar | G06K 9/2018 |

* cited by examiner

*Primary Examiner* — Atiba O Fitzpatrick
(74) *Attorney, Agent, or Firm* — Seyfarth Shaw LLP

(57) ABSTRACT

The invention proposes an instantaneous search and comparison method for large-scale distributed palm vein micro-feature data, which consists of three parts: 1) feature extraction and calculation of palm vein micro-feature images; 2) building a feature database; 3) search and comparison. The technical solution provided by this invention, referring to the idea of GIS and web search method, is applied to the search and comparison of the palm vein micro-feature data, which enables instantaneous recognition on massive palm vein micro-feature data under large-scale, large-traffic and high-frequency application scenarios, and solves the technical problem that traditional palm vein recognition methods can not be applied to large-scale and large-traffic scenarios due to low speed thereof.

5 Claims, 4 Drawing Sheets

INSTANTANEOUS SEARCH AND COMPARISON METHOD FOR LARGE-SCALE DISTRIBUTED PALM VEIN MICRO-FEATURE DATA

CROSS REFERENCE TO RELATED APPLICATIONS

This is a US Patent Application of, and claims priority to, CN201910331143.3, filed Apr. 23, 2019, the disclosures of which is incorporated herein by reference in its entirety.

FIELD

The present disclosure belongs to a field of biometric features recognition, relates to a technical field of computer image processing and pattern recognition, and more particularly, to an instantaneous search and comparison method for large-scale distributed palm vein micro-feature data.

BACKGROUND

With the development and application of deep learning and other artificial intelligence technologies, more and more biometric feature recognition technologies have been developed and applied. At present, the face recognition has been widely applied. However, due to the lack of differentiated features between different individuals, no matter how powerful the algorithm is, it is still difficult to distinguish two people with similar looks, such as twins. Therefore, the face recognition technology is difficult to be applied to the identification of individuals in super large-scale population. The palm vein recognition is a technology that uses micro-features of vein distribution inside the palm of the human body for identification, which belongs to a living body recognition of internal features, cannot be counterfeited or forged, thus has a high security level and contains vast differentiation information features between individuals, and can be applied to large traffic and large-scale application scenarios.

In the past, since the computing performance of computer is insufficient and the excellent artificial intelligence algorithm is not powerful enough, how to deal with the instantaneous comparison of large-scale and massive palm vein micro-feature data has become a difficult problem in the development of the palm vein recognition technology. The conventional palm vein recognition has many limitations. Although the recognition accuracy is high, the recognition speed is slow and it is difficult to meet the large traffic and high frequency usage requirements. The present disclosure provides an instantaneous search and comparison method for large-scale distributed palm vein micro-feature data, which not only utilizes the vein distribution features of the whole palm, but also adopts the method of combining the global feature vector index and the local feature vector index of the deep learning, and introduces the inverted index method widely used in network search engine, to overcome the technical difficulty of the conventional palm vein recognition, and to break through the bottleneck of slow comparison speed. Through the technical solution, the problem that the recognition speed of palm vein recognition is slow under the large traffic and large-scale application scenarios can be solved, and instantaneous recognition with ultra-large traffic and ultra-high precision is realized.

SUMMARY

As for the above existing problems, the present disclosure provides an instantaneous search and comparison method for large-scale distributed palm vein micro-feature data, using for reference of the idea of Map Zoom Level in GIS (Geographic Information System), the Map Zoom Level is ranged from 0 to 8 layers like a pyramid structure. The top layer 8 only has the thickest vein information, and as the number of layers decreases, the details gradually increase, thereby forming a sequence. Since the image of the bottom layer 0 has plenitude details, which needs to be segmented, then the convolution neural network is respectively applied to each layer and the segmented plate images to obtain a global and local feature vector, these vectors are categorized respectively by adopting a clustering algorithm, so as to form a global feature vector index and a local feature vector index, as well as a global and a local inverted index. Similar to the web multi-keyword search of a search engine, the vectors of each layer of Zoom level and the vector of the local plate at the bottom layer are each equivalent to a web keyword, candidate target web pages are the intersection and union of the search results of these keywords. Therefore, the search comparison of palm vein micro-feature data is similar, but more complex than the web search engine. Like PageRank of the web search, palm vein micro-feature data compare also needs to calculate the fraction according to the similarity, and take the feature vector with the highest similarity fraction as the final matched target.

To achieve the above-mentioned objective, the present disclosure provides an instantaneous search and comparison method for large-scale distributed palm vein micro-feature data, specifically including:

S1: feature extraction and calculation of a palm vein micro-feature image, specifically comprises:

S1-1: building multi-scale palm vein feature spaces, let the original image be $L_0$, building a downsample image pyramid sequence $Sp=\{L_0, L_1, \ldots, L_{n-1}\}$, where n is the total image number, c is the downsample factor;

S1-2: palm vein image enhancement, implement multi-scale Gauss filters on each layer of the sequence Sp, then extract the vein on the filtered images, combine the vein images under different scale kernels, obtaining the vein image sequence $\{V_0, V_1, \ldots, V_{n-1}\}$;

S1-3: extract the global and local features of the vein image sequence, combine the global and local features together to get the final feature F;

S2: building feature database, specifically comprises:

S2-1: bucket partition on the global features from the feature dataset, initialize z buckets randomly, classifying each global feature using cluster algorithm;

S2-2: building an inverted index for the local feature, building a "local feature ID—user ID" pair for the local feature of each feature F, building index system for all the local features, grouping the local features that are close in distance as one class, and putting the user IDs with the same local feature class to the inverted recording list;

S3: search and comparison, specifically comprises:

S3-1: introduce the feature H to be compared;

S3-2: get the bucket index sequence $\{id_0, id_1, \ldots, id_{p-1}\}$ by using the p global features $H_0$ of the feature H, then implement the search in the acquired p buckets parallelly, the searching process in each bucket comprises:

1) traverse all the local features of the feature H, find the t nearest neighbors of each local feature;

2) find the set $T_m$ of user IDs corresponding to the t neighbors;

3) implement the intersection operation on all the IDs acquired from the m local features:

$$G_{id}=T_0 \cap T_1 \cap \ldots \cap T_{m-1}=\{ID_0, ID_1, \ldots, ID_j\}$$

obtaining the ID set of each bucket;

S3-3: implement the union operation on ID set of each bucket, i.e., $$G=G_0 \cup G_1 \cup \ldots G_{p-1}=\{g_0, g_1, \ldots, g_j\}$$

get the final ID set G;

S3-4: calculate the similarity score of feature H with each feature in set G;

$$s = \frac{\sum_{i=0}^{m-1} |vg_i - vp_i|}{m}$$

where, vg is the local feature vector of G, vp is the local feature vector of H, m is the number of local features;

S3-5: select the one with the highest similarity score as the final matched target.

The technical solution provided by the present disclosure can implement instant comparison and recognition of mass palm vein micro-feature under large-scale and large-traffic application scenarios, which overcomes the problem that the speed of conventional palm vein recognition in mass data comparison and recognition is slow, and breaks through the development bottleneck of palm vein recognition technology.

DETAILED DESCRIPTION OF THE EMBODIMENTS

In order to make the objective and technical solution of the present disclosure clearer, the present disclosure will be furthermore described in detail and completely below with reference to the accompanying drawings. It should be appreciated that, the specific embodiments described herein is merely for the purpose of explanation of the technical solution of the present disclosure, other embodiments obtained by those skilled in the art without making creative effort shall fall within the protection scope of the present disclosure.

Figure 1:
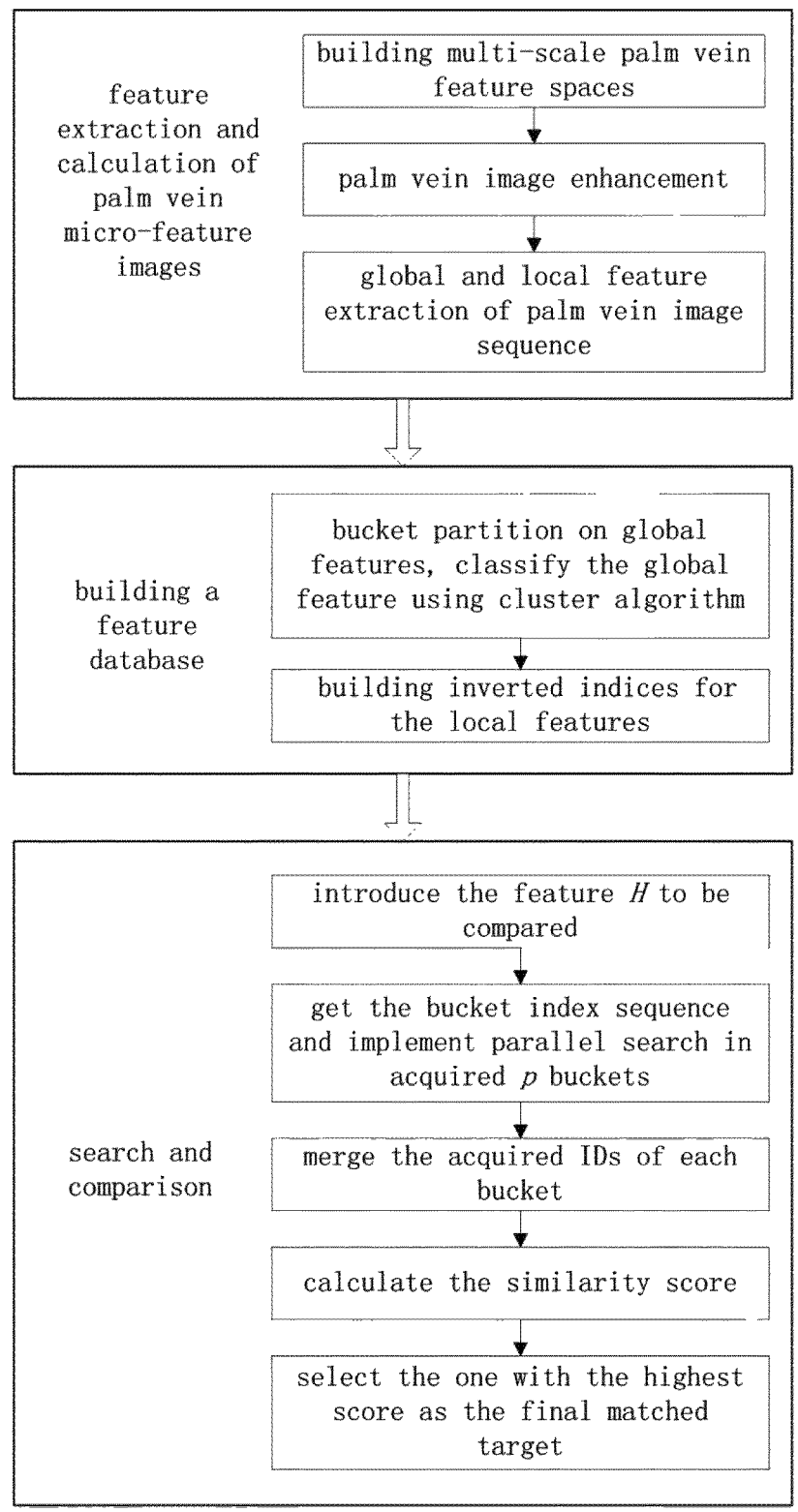
FIG. 1 is a flow chart of a technical solution of the present disclosure.

An instantaneous search and comparison method for large-scale distributed palm vein micro-feature data, which consists of three parts: 1) feature extraction and calculation of palm vein micro-feature images; 2) building a feature database; 3) search and comparison, as shown in FIG. 1, specific implemented steps are given as follows.

Figure 2:
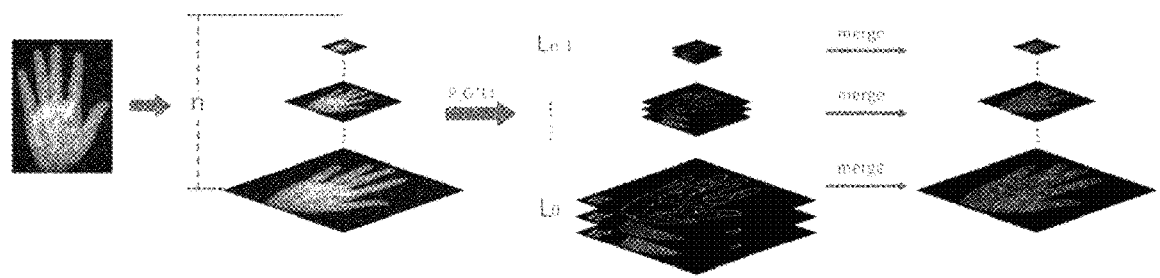
FIG. 2 is a schematic diagram of generating a vein image sequence of the present disclosure.

S1: feature extraction and calculation of a palm vein micro-feature image, specifically comprises:

S1-1: building multi-scale palm vein feature spaces, let the original image be $L_0$, building a downsample image pyramid sequence $Sp=\{L_0, L_1, \ldots, L_{n-1}\}$, where n is the total image number, c is the downsample factor;

S1-2: palm vein image enhancement, implement multi-scale Gauss filters on each layer of the sequence Sp, then extract the vein on the filtered images, combine the vein images under different scale kernels, obtaining the vein image sequence $\{V_0, V_1, \ldots, V_{n-1}\}$, as shown in FIG. 2 which is a schematic diagram of generating a vein image sequence.

Furthermore, the multi-scale Gauss filters specifically refers to:

$$Z_i^k(x,y)=G(x,y,k\sigma)*L_i(x,y)$$

$L_i(x,y)$ denotes the input image, $Z_i^k(x,y)$ denotes the output image, * is the convolution operator, subscript i denotes the image sequence index, $G(x,y,k\sigma)$ is the Gauss filter kernel where:

$$G(x, y, k\sigma) = \frac{1}{2\pi(k\sigma)^2} \exp\left(-\frac{x^2 + y^2}{2(k\sigma)^2}\right)$$

k is the scale parameter of the Gauss filer kernel, and the parameter $k \in K=\{1,2,3\}$.

Furthermore, the step of extracting the vein on the filtered images and combining the vein images under different scale kernels are specifically implemented through the following steps.

First, performing vein splitting by using Phase Stretch Transform algorithm, $$A[x,y]=\angle\langle \text{IFFT2}\{\tilde{K}[\alpha,\beta] \cdot \text{FFT2}\{B[x,y]\}\}\rangle$$

where, B[x,y] is the input image, A[x,y] is the output image, $\angle\langle\cdot\rangle$ is the angle operator, FFT2 is the two-dimensional fast fourier transform, IFFT2 is the inverse two-dimensional fast fourier transform, α and β are the two-dimensional frequency variables, $\tilde{K}[\alpha,\beta]$ is a phase distortion kernel function, i.e., $$\tilde{K}[\alpha, \beta] = e^{j \cdot \varphi[\alpha,\beta]}$$

$$\varphi[\alpha, \beta] = \varphi_{polar}[r, \theta]$$

$$= \varphi_{polar}[r]$$

$$= S \cdot \frac{W \cdot r \cdot \tan^{-1}(W \cdot r) - (1/2) \cdot \ln(1 + (W \cdot r)^2)}{W \cdot r_{max} \cdot \tan^{-1}(W \cdot r_{max}) - (1/2) \cdot \ln(1 + (W \cdot r_{max})^2)}$$

where, $r=\sqrt{\alpha^2+\beta^2}$, the final value of φ is irrelevant to θ, thus can be omitted directly, $r_{max}$ is the maximum value of r, S is the strength coefficient, and W is the distortion strength, the values of S and W depend on the image.

Second, merging the vein images under different scale kernels, $$V_i = \underset{k}{\text{merge}}(V_i^k)$$

where, the merging operation consists of the following steps:

a) binarize $V_i^k$;

b) calculate the summation of the binarized $V_i^k$ in corresponding position, i.e., $$V_i(x, y) = \sum_k V_i^k(x, y)$$

c) perform the region extremum growth on the image $V_i$, i.e., $$v(x, y) = \begin{cases} 0 & \text{if } v(x, y) = 0 \\ (v(x, y) & \text{if } v(x, y) \neq 0 \text{ and } v_{max\text{-}neighbor} \leq thr \\ v_{max\text{-}neighbor} & \text{if } v(x, y) \neq 0 \text{ and } v_{max\text{-}neighbor} > thr \end{cases}$$

where, $v_{max\text{-}neighbor}$ is the maximum value in the region, thr is an experience threshold, and generating the vein image sequence $\{V_0, V_1, \ldots, V_{n-1}\}$ after merging.

S1-3: extract the global and local features of the vein image sequence, combine the global and local features together to get the final feature F.

Furthermore, the step of extracting the global and local features of the vein image sequence specifically includes the following step:

select the first p sequence images $O=\{V_0, V_1, \ldots, V_{p-1}\}$ from the vein image sequence $\{V_0, V_1, \ldots, V_{n-1}\}$ for the global feature calculation, the remaining images used for the local feature calculation.

Figure 3:
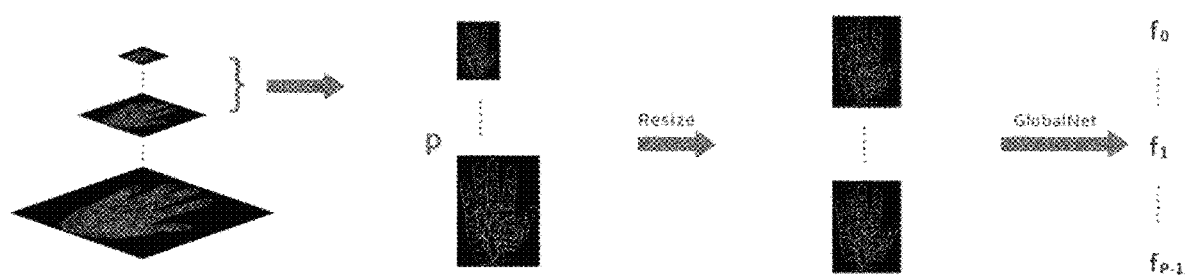
FIG. 3 is a schematic diagram of extracting a global feature vector of the present disclosure.

As shown in FIG. 3, the network used for the global feature calculation is GlobalNet; primary vein extraction on the sequence images O one by one, resize the primary vein sequence images to the same size and input them to the network GlobalNet, generating the feature vector sequence:

$$F_O = \{f_0, f_1, \ldots, f_{p-1}\}.$$

Figure 4:
FIG. 4 is a network structure diagram of extracting a global feature vector of the present disclosure.
Figure 5:
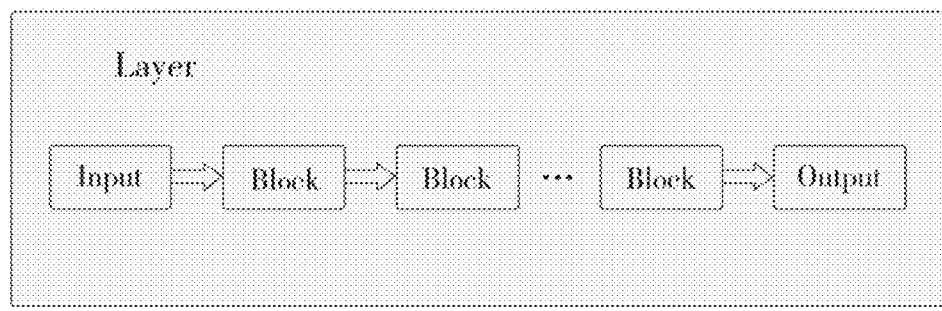
FIG. 5 is a Layer structure schematic diagram of a convolutional neural network of the present disclosure.
Figure 6:
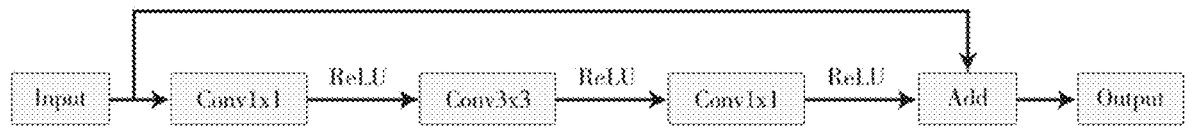
FIG. 6 is a Block structure schematic diagram of a convolutional neural network of the present disclosure.

As shown in FIG. 4, the global feature vector extraction network (GlobalNet) mainly consists of four layers, each layer consists of multiple Blocks. Layer 1 has 3 Blocks, Layer 2 has 4 Blocks, Layer 3 has 23 Blocks, and Layer 4 has 3 Blocks. The output of Layer 4 generates global feature vectors through AvgPool layer. As shown in FIG. 5 which is a Layer structure schematic diagram of a convolutional neural network of the present disclosure, and FIG. 6 shows a Block structure schematic diagram of a convolutional neural networks of the present disclosure.

Figure 7:
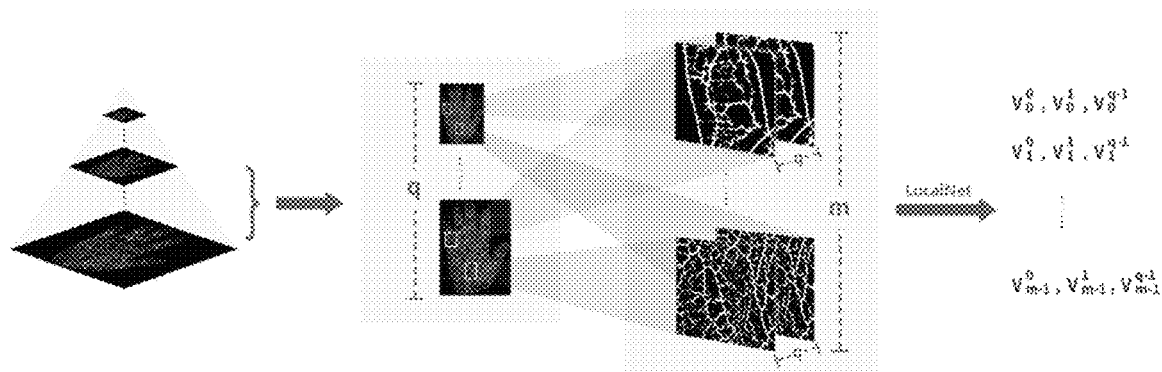
FIG. 7 is a schematic diagram of extracting a local feature vector of the present disclosure.

As shown in FIG. 7, for the local feature, region segmentation on the vein image and segmentation on the remaining images are required for the local feature calculation, suppose the number of remaining images is q, the whole palm is divided into m local regions, for each local region, input the local vein image into the network LocalNet and generate the local feature vector $v_m^q$, where the superscript q denotes the sequence index, subscript m denotes the local feature index in the whole palm, subsequently, merging the local features in the sequence with the same position, i.e., $$v_m = \frac{\sum_{i=0}^{q-1} v_m^i}{q}$$

get the final local feature $F_l = \{v_0, v_1, \ldots, v_{m-1}\}$;

combine the global and local features together to obtain the final feature F, i.e., $$F = (p, m, F_o, F_l)$$

Figure 8:
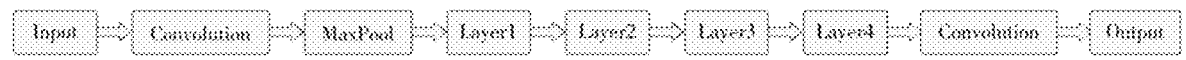
FIG. 8 is a network structure diagram of extracting a local feature vector of the present disclosure.

As shown in FIG. 8, the local feature vector extraction network (LocalNet) also consists of 4 layers, the number of Block of each layer is 3, 4, 6 and 3 in sequence. The output of Layer 4 generates the local feature vector through Convolution.

S2: building feature database, specifically comprises:

S2-1: bucket partition on the global features from the feature dataset, initialize z buckets randomly, classifying each global feature using cluster algorithm;

Furthermore, the step of classifying each global feature using cluster algorithm specifically includes:

for the feature F, since there are p groups of global features, generating partition vector $D=\{id_0, id_1, \ldots, id_{p-1}\}$, where $id_k$ denotes the bucket index of the class k+1, counting the class index assigned to the feature F, the feature F will be considered to be the class with the most assignments, if all the assignments are 1, select the first group with index 0 as the feature F class id.

S2-2: building an inverted index for the local feature, building a "local feature ID—user ID" pair for the local feature of each feature F, building index system for all the local features, grouping the local features that are close in distance as one class, and putting the user IDs with the same local feature class to the inverted recording list.

S3: search and comparison, specifically comprises:

S3-1: introduce the feature H to be compared;

S3-2: get the bucket index sequence $\{id_0, id_1, \ldots, id_{p-1}\}$ by using the p global features $H_0$ of the feature H, then implement the search in the acquired p buckets parallelly, the searching process in each bucket comprises:

1) traverse all the local features of the feature H, find the t nearest neighbors of each local feature;

2) find the set $T_m$ of user IDs corresponding to the t neighbors;

3) implement the intersection operation on all the IDs acquired from the m local features:

$$G_{id} = T_0 \cap T_1 \cap \ldots \cap T_{m-1} = \{ID_0, ID_1, \ldots, ID_j\}$$

obtaining the ID set of each bucket;

S3-3: implement the union operation on ID set of each bucket, i.e., $$G = G_0 \cup G_1 \cup \ldots G_{p-1} = \{g_0, g_1, \ldots, g_j\}$$

get the final ID set G;

S3-4: calculate the similarity score of feature H with each feature in set G;

$$s = \frac{\sum_{i=0}^{m-1} |vg_i - vp_i|}{m}$$

where, vg is the local feature vector of G, vp is the local feature vector of H, m is the number of local features;

S3-5: select the one with the highest similarity score as the final matched target.

Therefore, finally the feature vector with the highest similarity fraction is the final matched target, and the user ID corresponding to the feature vector is the final result of the comparison and recognition. The technical solution provided by the present disclosure, using for reference of the idea of GIS and the method of web search, is applied to the search comparison of palm vein micro-feature data, can achieve instantaneous comparison and recognition of mass palm vein micro-feature data in the large-scale, large-traffic and high-frequency application scenarios, and solve the technical problem that the conventional palm vein recognition cannot be applied in large-scale and large-traffic due to its low speed.

The above-mentioned content can be implemented by those skilled in the art, any modification, equivalent replacement made without departing from the concept of the technical solution of the present disclosure shall all fall within the protection scope of the present disclosure.

The invention claimed is:

1. An instantaneous search and comparison method for large-scale distributed palm vein micro-feature data, includes the following steps:
  S1: feature extraction and calculation of a palm vein micro-feature image, specifically comprises:
  S1-1: building multi-scale palm vein feature spaces, let the original image be $L_0$, building a downsample image pyramid sequence $Sp=\{L_0, L_1, \ldots, L_{n-1}\}$, where n is the total image number, c is the downsample factor;
  S1-2: palm vein image enhancement, implement multi-scale Gauss filters on each layer of the sequence Sp, then extract the vein on the filtered images, combine the vein images under different scale kernels, obtaining the vein image sequence $\{V_0, V_1, \ldots, V_{n-1}\}$;
  S1-3: extract the global and local features of the vein image sequence, combine the global and local features together to get the final feature F;
  S2: building feature database, specifically comprises:
  S2-1: bucket partition on the global features from the feature dataset, initialize z buckets randomly, classifying each global feature using cluster algorithm;
  S2-2: building an inverted index for the local feature, building a "local feature ID—user ID" pair for the local feature of each feature F, building index system for all the local features, grouping the local features that are close in distance as one class, and putting the user IDs with the same local feature class to the inverted recording list;
  S3: search and comparison, specifically comprises:
  S3-1: introduce the feature H to be compared;
  S3-2: get the bucket index sequence $\{id_0, id_1, \ldots, id_{p-1}\}$ by using the p global features $H_0$ of the feature H, then implement the search in the acquired p buckets parallelly, the searching process in each bucket comprises:
  1) traverse all the local features of the feature H, find the t nearest neighbors of each local feature;
  2) find the set $T_m$ of user IDs corresponding to the t neighbors;
  3) implement the intersection operation on all the IDs acquired from the m local features:

$$G_{id}=T_0 \cap T_1 \cap \ldots \cap T_{m-1}=\{ID_0, ID_1, \ldots, ID_j\}$$

obtaining the ID set of each bucket;
  S3-3: implement the union operation on ID set of each bucket, i.e., $$G=G_0 \cup G_1 \cup \ldots G_{p-1}=\{g_0, g_1, \ldots, g_j\}$$

get the final ID set G;
  S3-4: calculate the similarity score of feature H with each feature in set G;

$$s = \frac{\sum_{i=0}^{m-1} |vg_i - vp_i|}{m}$$

where, vg is the local feature vector of G, vp is the local feature vector of H, m is the number of local features;
  S3-5: select the one with the highest similarity score as the final matched target.

2. The instantaneous search and comparison method for large-scale distributed palm vein micro-feature data according to claim 1, the multi-scale Gauss filters in step S1-2 are:

$$Z_i^k(x,y)=G(x,y,k\sigma)*L_i(x,y)$$

$L_i(x,y)$ denotes the input image, $Z_i^k(x,y)$ denotes the output image, * is the convolution operator, subscript i denotes the image sequence index, $G(x,y,k\sigma)$ is the Gauss filter kernel, where:

$$G(x, y, k\sigma) = \frac{1}{2\pi(k\sigma)^2}\exp\left(-\frac{x^2 + y^2}{2(k\sigma)^2}\right)$$

k is the scale parameter of the Gauss filer kernel, and the parameter $k \in K=\{1,2,3\}$.

3. The instantaneous search and comparison method for large-scale distributed palm vein micro-feature data according to claim 1, extract vein on filtered image, and then combine the vein images under different scale kernels in the S1-2, specifically comprises:

first, performing vein splitting by using Phase Stretch Transform algorithm, $$A[x,y]=\angle\langle \text{IFFT2}\{\tilde{K}[\alpha,\beta]\cdot \text{FFT2}\{B[x,y]\}\}\rangle$$

where, B[x,y] is the input image, A[x,y] is the output image, $\angle\langle\cdot\rangle$ is the angle operator, FFT2 is the two-dimensional fast fourier transform, IFFT2 is the inverse two-dimensional fast fourier transform, $\alpha$ and $\beta$ are the two-dimensional frequency variables, $\tilde{K}[\alpha,\beta]$ is a phase distortion kernel function, i.e., $$\tilde{K}[\alpha, \beta] = e^{j\cdot\varphi[\alpha,\beta]}$$

$$\varphi[\alpha, \beta] = \varphi_{polar}[r, \theta]$$
$$= \varphi_{polar}[r]$$
$$= S \cdot \frac{W \cdot r \cdot \tan^{-1}(W \cdot r) - (1/2)\cdot \ln(1 + (W \cdot r)^2)}{W \cdot r_{max} \cdot \tan^{-1}(W \cdot r_{max}) - (1/2)\cdot \ln(1 + (W \cdot r_{max})^2)}$$

where, $r=\sqrt{\alpha^2+\beta^2}$, the final value of $\varphi$ is irrelevant to $\theta$, thus can be omitted directly, $r_{max}$ is the maximum value of r, S is the strength coefficient, and W is the distortion strength, the values of S and W depend on the image;

second, merging the vein images under different scale kernels, $$V_i = \underset{k}{\text{merge}}(V_i^k)$$

where, the merging operation consists of the following steps:

a) binarize $V_i^k$;

b) calculate the summation of the binarized $V_i^k$ in corresponding position, i.e., $$V_i(x,y) = \sum_k V_i^k(x,y)$$

c) perform the region extremum growth on the image $V_i$, i.e., $$v(x,y) = \begin{cases} 0 & \text{if } v(x,y) = 0 \\ v(x,y) & \text{if } v(x,y) \neq 0 \text{ and } v_{max\text{-}neighbor} \leq thr \\ v_{max\text{-}neighbor} & \text{if } v(x,y) \neq 0 \text{ and } v_{max\text{-}neighbor} > thr \end{cases}$$

Where, $v_{max\text{-}neighbor}$ is the maximum value in the region, thr is an experience threshold, and generating the vein image sequence $(V_0, V_1, \ldots, V_{n-1})$ after merging.

4. The instantaneous search and comparison method for large-scale distributed palm vein micro-feature data according to claim 1, the global and local features extraction for vein image sequence in S1-3, specifically comprises:

select the first p sequence images $O=\{V_0, V_1, \ldots, V_{p-1}\}$ from the vein image sequence $\{V_0, V_1, \ldots, V_{n-1}\}$ for the global feature calculation, the remaining images used for the local feature calculation;

the network used for the global feature calculation is GlobalNet; primary vein extraction on the sequence images O one by one, resize the primary vein sequence images to the same size and input them to the network GlobalNet, generating the feature vector sequence:

$$F_O = \{f_0, f_1, \ldots, f_{p-1}\};$$

region segmentation on the vein image and segmentation on the remaining images are required for the local feature calculation, suppose the number of remaining images is q, the whole palm is divided into m local regions, for each local region, input the local vein image into the network LocalNet and generate the local feature vector $v_m^q$, where the superscript q denotes the sequence index, subscript m denotes the local feature index in the whole palm, subsequently, merging the local features in the sequence with the same position, i.e., $$v_m = \frac{\sum_{i=0}^{q-1} v_m^i}{q}$$

get the final local feature $F_l = \{v_0, v_1, \ldots, v_{m-1}\}$;

combine the global and local features together to obtain the final feature F, i.e., $$F = (p, m, F_O, F_l).$$

5. The instantaneous search and comparison method for large-scale distributed palm vein micro-feature data according to claim 1, classify each global feature using a cluster algorithm in S2-1, specifically comprises:

for the feature F, since there are p groups of global features, generating partition vector $D=\{id_0, id_1, \ldots, id_{p-1}\}$, where id denotes the bucket index of the class k+1, counting the class index assigned to the feature F, the feature F will be considered to be the class with the most assignments, if all the assignments are 1, select the first group with index 0 as the feature F class id.

* * * * *